(12) United States Patent
Joe et al.

(10) Patent No.: US 9,606,216 B2
(45) Date of Patent: Mar. 28, 2017

(54) INDOOR POSITIONING SYSTEM, AND DEVICE AND METHOD THEREFOR

(71) Applicant: SK TELECOM CO., LTD., Seoul (KR)

(72) Inventors: Moonok Joe, Seoul (KR); Hoojeong Lee, Seoul (KR); Kwangyeob You, Seoul (KR); Seunghyun Choo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 124 days.

(21) Appl. No.: 14/546,492

(22) Filed: Nov. 18, 2014

(65) Prior Publication Data

US 2015/0072710 A1    Mar. 12, 2015

Related U.S. Application Data

(63) Continuation of application No. PCT/KR2013/004386, filed on May 20, 2013.

(30) Foreign Application Priority Data

May 18, 2012    (KR) .................. 10-2012-0052794

(51) Int. Cl.
*H04M 11/04*    (2006.01)
*G01S 5/02*    (2010.01)
*H04W 64/00*    (2009.01)

(52) U.S. Cl.
CPC .............. *G01S 5/0252* (2013.01); *G01S 5/02* (2013.01); *G01S 5/0236* (2013.01); *H04W 64/00* (2013.01)

(58) Field of Classification Search
CPC .............................. G01S 5/0252; H04W 64/00
USPC ........................................ 455/404.2
See application file for complete search history.

(56) References Cited

U.S. PATENT DOCUMENTS

| | | | |
|---|---|---|---|
| 5,724,346 A * | 3/1998 | Kobayashi et al. | ...... H04J 3/92 370/3 |
| 2004/0203420 A1 | 10/2004 | Rick et al. | |
| 2005/0261004 A1 | 11/2005 | Dietrich et al. | |
| 2010/0113061 A1 | 5/2010 | Holcman | |
| 2011/0176455 A1 | 7/2011 | Matsunada | |

FOREIGN PATENT DOCUMENTS

| | | |
|---|---|---|
| KR | 1020080035955 A | 4/2008 |
| KR | 100994840 B1 | 11/2010 |

(Continued)

OTHER PUBLICATIONS

International Search Report for PCT/KR2013/004386 dated Aug. 27, 2013.

*Primary Examiner* — Charles Appiah
*Assistant Examiner* — Randy Peaches
(74) *Attorney, Agent, or Firm* — Hauptman Ham, LLP

(57) ABSTRACT

A terminal device for indoor positioning includes a communication module to receive access point (AP) radio environment information from one or more Aps, a memory module to store the AP radio environment information in a preset number of frame areas, the AP radio environment information being stored in order of reception, and a terminal control module to calculate an estimated location of the terminal device based on the order of the AP radio environment information stored in the preset number of frame areas.

14 Claims, 5 Drawing Sheets

(56) References Cited

FOREIGN PATENT DOCUMENTS

| KR | 1020110061978 A | 6/2011 |
| KR | 1020110103421 A | 9/2011 |
| KR | 1020120041972 A | 5/2012 |

* cited by examiner

INDOOR POSITIONING SYSTEM, AND DEVICE AND METHOD THEREFOR

CROSS-REFERENCE TO RELATED APPLICATION

The instant application is a continuation of PCT/KR2013/004386, filed May 20, 2013, which is based on and claims priority to Korean Patent Application No. 10-2012-0052794, filed on May 18, 2012. The disclosures of above-listed applications are hereby incorporated by reference herein in their entirety.

TECHNICAL FIELD

The present disclosure in exemplary embodiments relates to an indoor positioning system, and an apparatus and method therefor.

BACKGROUND

The statements in this section merely provide background information related to the present disclosure and may not constitute prior art.

Among various multimedia communication services, location-based services use locational and geographical information and their broad applicability and convenience have led to the great demand therefor. Position calculation technology for delivering location-based services is classified into a network based method for measuring the location of a terminal device (hereinafter, referred to as "terminal" soley for convenience of description) by using radio environment information of a relay apparatus or an access point (AP) to perform software positioning, a handset based method by using a GPS (global positioning system) receiver provided in a terminal, and a hybrid of the two methods.

Recent years have seen the growing use of the network based positioning technologies in GPS shadow areas such as indoor spaces and building basements. Such an indoor positioning system is implemented using a triangulation method and a fingerprint method based on radio environment information received from a network apparatus. However, the inventor(s) has experienced that the fingerprint method for indoor positioning bears a disadvantage in that it consumes a substantial amount of resources (time, server transaction, maintaining a network session, a great deal of AP installations and the like) to analyze a huge existing database. Therefore, the inventor(s) has noted that a new indoor positioning method is needed to improve the accuracy of the fingerprint-based indoor positioning as well as a substantial amount of resources.

SUMMARY

In accordance with some embodiments of the present disclosure, a terminal for an indoor positioning comprises a communication module, a memory module and a terminal control module. The communication module is configured to receive access point (AP) radio environment information from one or more Aps. The memory module is configured to store the AP radio environment information in a preset number of frame areas, wherein the AP radio environment information is stored in order of reception. And the terminal control module is configured to calculate an estimated location of the terminal device based on the order of the AP radio environment information stored in the preset number of frame areas.

In accordance with another embodiment of the present disclosure, a system for an indoor positioning comprises at least one access point (AP), a positioning apparatus and a terminal. The at least one AP is configured to transmit and receive near field communication signals and to generate and transmit at least one AP radio environment information. The positioning apparatus is configured to store location information corresponding to the AP radio environment information in a database and to provide the location information upon receiving a request for the location information from an external apparatus. And the terminal is configured to receive and orderly store the AP radio environment informations as received from the APs in a plurality of frame areas, to verify respective parameters included in the received AP radio environment informations and the pre-stored AP radio environment information respectively when the AP radio environment informations as received are pre-stored in the plurality of frame areas, to perform an update of or a deletion from the pre-stored AP radio environment information based on the respective parameters, and to calculate an estimated terminal location based on the stored or updated AP radio environment information.

In accordance with yet another embodiment of the present disclosure, a terminal device for indoor positioning is configured to receive access point (AP) radio environment information from one or more Aps, store the AP radio environment information to be inserted in a preset number of frame areas, the AP radio environment information being stored in order of reception, and calculate an estimated location of the terminal device based on the order of the AP radio environment informations stored in the preset number of frame areas.

DETAILED DESCRIPTION

Hereinafter, embodiments of the present disclosure will be described in detail with reference to the accompanying drawings.

The present disclosure in some embodiments provides an indoor positioning system which receives and stores access point (AP) information from an AP in preset frame regions on a first-in-first-out basis to calculate the position of a terminal, and, when the terminal positioning with AP information is unavailable, utilizes a fingerprint method over a pre-stored database in a positioning apparatus to calculate the position of the terminal, and an apparatus and method therefor.

An indoor positioning system according to the present disclosure may calculate the position of a terminal 120 in an environment including a positioning access point (AP) installed indoors by a mobile network or operator.

Figure 1:
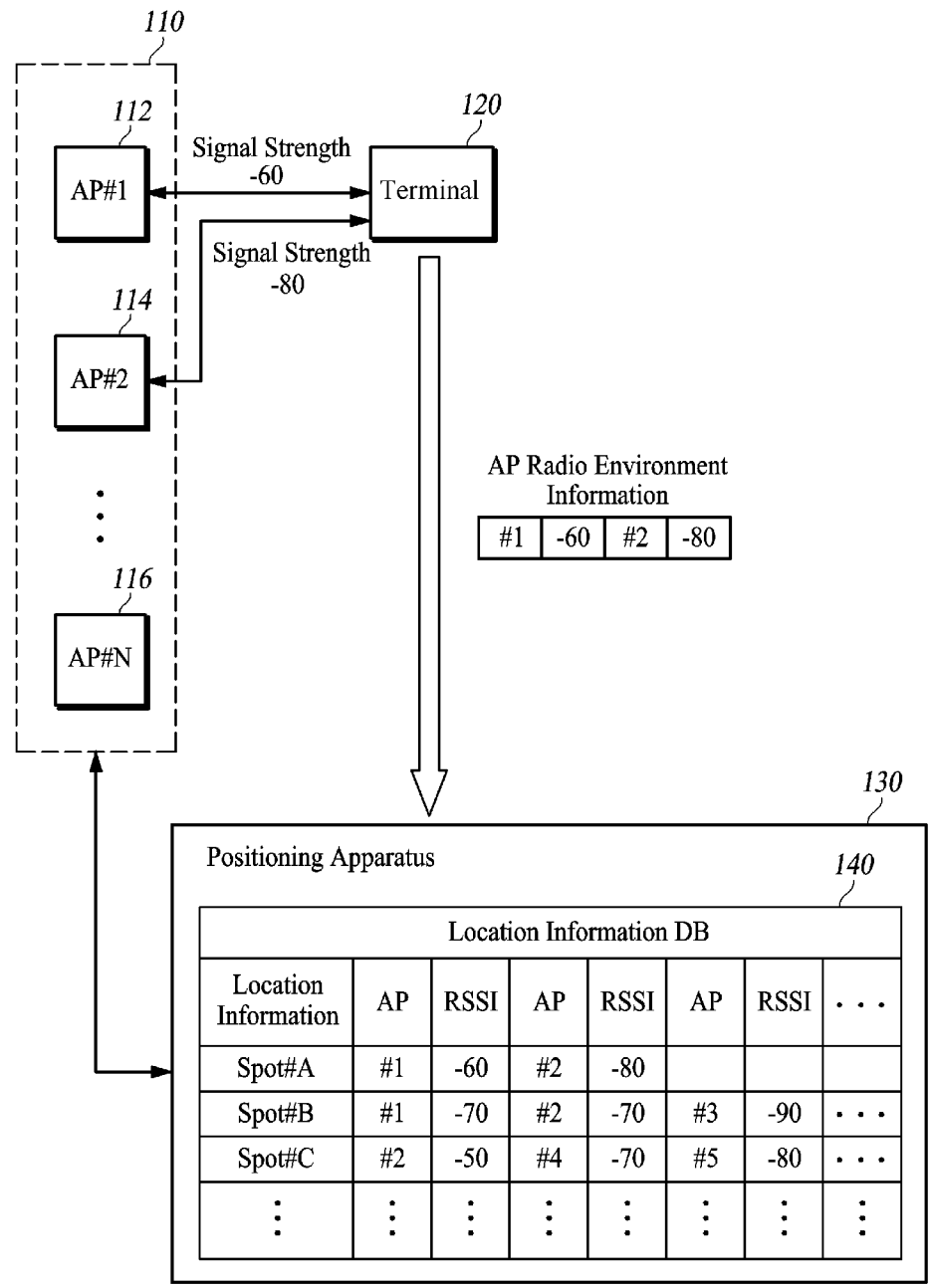
FIG. 1 is a schematic block diagram of an indoor positioning system based on a first-in first-out method according to at least one embodiment of the present disclosure.

FIG. 1 is a schematic block diagram of an indoor positioning system based on a first-in first-out method according to at least one embodiment.

As shown in FIG. 1, the indoor positioning system according to at least one embodiment includes at least one AP 110, at least one terminal 120 and a positioning apparatus 130. The positioning apparatus 130 may include a location information database (DB) 140. All or some components of the indoor positioning system, such as the at least one AP 110, the at least one terminal 120 and the positioning apparatus 130 are implemented by one or more processors and/or application-specific integrated circuits (ASICs).

The AP 110 refers to a wireless data communication relay apparatus which verifies destination information included in information received from a transmitter, designates an appropriate communication path for the information to arrive at a receiver, and transmits data over a communication network corresponding to the designated communication path. The AP 110 extracts a destination of a data packet, designates an optimal communication path to the extracted position and transfers the data packet to a next device on the designated communication path. The APs 110 are simultaneously connected to a plurality of terminals 120 with several communication lines shared between the terminals 120 in the general network environment to perform a local area network (LAN) communication.

The AP 110 according to at least one embodiment transmits, to the terminal 120, an AP radio environment information including an AP identification information, a service set identifier (SSID) information, a signal strength information and a signal transmission time information through short-range or near field communication. The AP 110 transmits the AP radio environment information to the terminal 120 periodically on a preset cycle in the form of a beacon signal to check a connection state and inform the terminal 120 on the AP radio environment.

As shown in FIG. 1, the AP 110 is implemented by N number of APs 110 such as AP #1 112, AP #2 114 through AP #N 116. For example, when AP #1 112 is installed at an entrance of a shopping mall by a mobile carrier or communications business operator and AP #2 114, AP #3 (not shown) through AP #N 116 are installed at intervals of 10 m, the terminal 120 may be connected to AP #1 112 with a signal strength of −60 and to AP #2 114 with a signal strength of −80. The AP 110 transmits the AP radio environment information with a preset signal strength, although the signal strength measured at the terminal 120 changes as the location of the terminal 120 changes.

In addition, the AP 110 may be one of a router, a repeater, a switch and a bridge and may be implemented by any device capable of performing near field communication such as wireless LAN communication, ultra wideband (UWB) communication, radio frequency communication, infrared data association (IrDA) communication, ZigBee communication and Bluetooth communication.

The terminal 120 refers to a communication terminal (or a communication terminal device, hereinafter referred to as "terminal" solely for convenience of description) for transmitting and receiving a variety of data via a communication relay apparatus including the AP 110 according to user key manipulations and it may be any one of a tablet PC (personal computer), a laptop, a PC, a smart phone, a personal digital assistant (PDA) and a mobile communication terminal. The terminal 120 performs voice or data communication assisted by the AP 110 and the communication network and includes a memory for storing a program or protocol for communication with an external device via the AP 110 and the communication network and a microprocessor for executing the program for operation and control. The terminal 120 is any terminal capable of performing communications assisted by the AP 110 and the communication network and include all communication and computing devices such as a laptop, a mobile communication terminal and a PDA. The terminal 120 includes a touchscreen for input/output operations and may execute a positioning application (not shown) with inputs through user manipulations. The positioning application when the terminal 120 is a smart phone refers to an application software downloaded and installed via an application software store and refers to a virtual machine (VM) and application software downloaded via a mobile operrator's server when the terminal 110 is a known feature phone.

The terminal 120 according to at least one embodiment receives an AP radio environment information from the AP 110 and performs at least one of storage, update and deletion of the received AP radio environment information in a preset frame area on a first-in-first-out basis. In addition, the terminal 120 calculates an estimated terminal location based on the stored AP radio environment information. The terminal 120 verifies the number of AP radio environment information updated or deleted in the terminal 120, and when the verified number of AP radio environment information is less than the number of preset AP radio environment information or when the position calculation is impossible because of the lack of stored AP radio environment information, the terminal 120 requests location information from the positioning apparatus 130 to calculate the estimated terminal location. The terminal 120 will be described in detail with the modules shown in FIGS. 2 and 3.

The positioning apparatus 130 includes the location information DB 140 for storing the AP radio environment information and the location information of the AP 110 installed indoors. The AP radio environment information includes AP identification information, SSID information, signal strength information and signal transmission time information. The location information refers to information about a location where the AP 110 matching the AP radio environment information is installed. The AP radio environment information and the location information may be stored in the location information DB 130 when the mobile carrier or communications business operator installs the APs 110 indoors.

The positioning apparatus 130 according at least one embodiment provides the terminal 120 with the location information pre-stored in the location information DB 140. More specifically, upon receiving a positioning request from the terminal 120, the positioning apparatus 130 extracts, from the location information DB 140, the location information corresponding to the AP radio environment information received from the terminal 120 by using the fingerprint method and provides the extracted location information to the terminal 120. The location information is coordinates of the AP 110, which are pre-stored in the location information DB 140 or an area including the AP 110.

The location information DB 140 refers to a typical data structure implemented in a storage space (hard disk or memory) of a computer system by using a database management program (DBMS) and it also refers to a type of data storage in which data can be searched for extracted, deleted, edited or added. The location information DB 140 may be implemented to serve the purpose of some embodiments of the present disclosure by using a relational database management system (RDBMS), such as Oracle, Infomix, Sybase and DB2; an object-oriented database management system (OODBMS), such as Gemston, Orion and O2; and an XML native database, such as Excelon, Tamino and Sekaiju. The location information DB 140 includes appropriate fields or elements required for the assigned functions.

Established according to at least one embodiment through operator manipulations or an algorithm, the location information DB 140 may store information on spots where the APs 110 are installed, for the location information, and may store information included in the AP radio environment information therefor. For example, the location information DB 140 may store a location where the signal strength of AP #1 is −60 and the signal strength of AP #2 is −80, as the location information of spot A. The location information DB 140 may store a location where the signal strength of AP #1 is −70, the signal strength of AP #2 is −70 and the signal strength of AP #3 is −90, as the location information of spot B.

Figure 2:
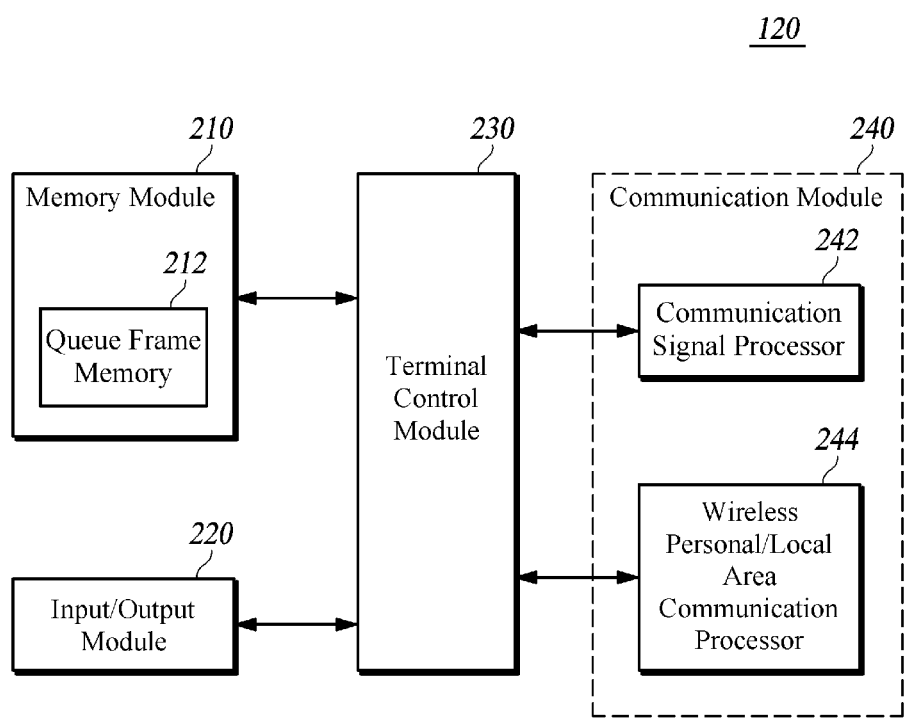
FIG. 2 is a schematic block diagram of an indoor positioning terminal according to at least one embodiment of the present disclosure.

FIG. 2 is a schematic block diagram of an indoor positioning terminal according to at least one embodiment.

The terminal 120 according to at least one embodiment includes a memory module 210, an input/output module 220, a terminal control module 230 and a communication module 240. The communication module 240 includes a communication signal processor 242 for transmitting and receiving voice and communication data and a wireless personal/local area communication processor 244 for transmitting and receiving near field communication signals with the AP 110 in order to calculate the position of the terminal 120. The memory module 210 may be implemented comprising a queue frame memory 212 for orderly storing the AP radio environment informations in a receipt order as received from the AP 110 in preset frame areas. All or some components of the terminal 120, such as the input/output module 220, the terminal control module 230 and the communication module 240 are implemented by one or more processors and/or application-specific integrated circuits (ASICs). The memory module 210 includes, for example, RAM, ROM, a flash memory and so on.

The memory module 210 refers to a module for storing a program or protocol for operation and communication of the terminal 120. The memory module 210 according to at least one embodiment includes the queue frame memory 212 for storing the AP radio environment information. The queue frame memory 212 will now be described in detail.

The queue frame memory 212 according to at least one embodiment includes N preset frame areas for storing the AP radio environment information received from the AP 110.

The queue frame memory 212 receives and transmits information in one direction and stores the AP radio environment information in the frame areas on a first-in-first-out basis. For example, when the AP radio environment information is received in order of (#1, −80) and (#2, −60), the queue frame memory 212 in an implementation may receive input (#1, −80) at a first frame area and receive input (#2, −60) at a second frame area, and then place the first frame area at an output side of the queue frame memory 212.

The input/output module 220 receives a command via user manipulation and outputs operative signals of the terminal 120 according to the received command and it may be implemented by a touchscreen for performing the user-operated input/output. Although the input/output module 220 according to at least one embodiment is illustrated as a single module for performing an input/output function, the terminal 120 of some type or usage may comprise two separate modules of an input module and an output module.

The terminal control module 230 according to at least one embodiment controls an operation performed for measuring the position of the terminal 120. The terminal control module 230 verifies the AP radio environment information including at least one of the AP identification information, SSID information, signal strength information and signal transmission time information received from the communication module 240.

In the absence of pre-stored AP radio environment information in the queue frame memory 212, the terminal control module 230 orderly stores the AP radio environment information in order of arrival but performs an update of or a deletion from the AP radio environment information in response to pre-stored AP radio environment information. For example, the terminal control module 230 may be responsive to the AP radio environment information having unchanged AP identification information but changed signal strength information, for updating the latter only, and it may delete the AP radio environment information in the first input frame area when a preset number of frame areas is used up.

The terminal control module 230 verifies the number of stored AP radio environment information to determine whether an estimated terminal location is calculable, and if yes, it calculates the estimated terminal location by using the AP radio environment information stored in the queue frame memory 212. The terminal control module 230 requests the positioning apparatus 130 for the location information when the verified number of AP radio environment information is nonexistent or short of a preset number, disabling a calculation of an estimated terminal location. The estimated terminal location may be calculated by applying a plurality of AP radio environment information to a heuristic approach or by using a received signal strength indication (RSSI) fingerprint method and a triangulation method as necessary.

The communication module 240 transmits and receives data to and from the AP 110, the positioning apparatus 130 and the communication network (not shown) connected to the terminal 120, and it includes the communication signal processor 242 for processing general voice and communication data and the wireless personal/local area communication processor 244 for positioning.

The wireless personal/local area communication processor 244 according to at least one embodiment receives the AP radio environment information from the AP 110 by using near field communication signals in order to measure the location of the terminal 120, and transmits the AP radio environment information to the terminal control module 230. The near field communication signal used may be at least one signal of wireless LAN communication, ultra wideband (UWB) communication, radio frequency communication, infrared data association (IrDA) communication, ZigBee communication and Bluetooth communication.

Figure 3:
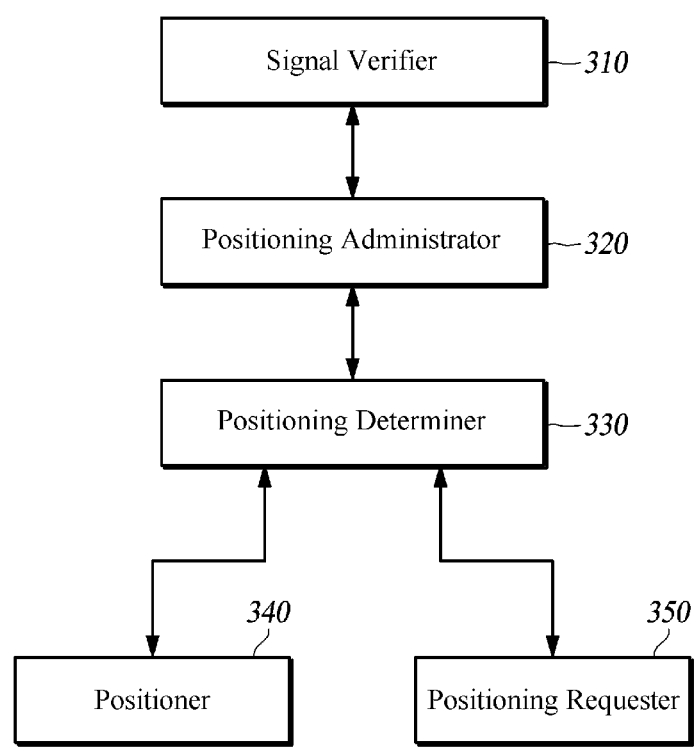
FIG. 3 is a schematic block diagram of a terminal control module according to at least one embodiment of the present disclosure.

FIG. 3 is a schematic block diagram of a terminal control module according to at least one embodiment.

The terminal control module 230 according to at least one embodiment includes a signal verifier 310, a positioning administrator 320 and a positioning determiner 330. All or some components of the terminal control module 230, such as the signal verifier 310, the positioning administrator 320 and the positioning determiner 330 are implemented by one or more processors and/or application-specific integrated circuits (ASICs).

The signal verifier 310 verifies the AP radio environment information transmitted from the communication module 240 and received by the terminal control module 230.

The signal verifier 310 according to at least one embodiment verifies the AP radio environment information including at least one of AP identification information, SSID information, signal strength information and signal transmission time information. For example, the signal verifier 310 may verify whether the signal strength of the AP radio environment information received from AP #1 is −70 and provide the verified AP environment information to another part within the terminal control module 230.

The positioning administrator 320 administrates an operation performed when the AP radio environment information is stored in the queue frame memory 212 of the memory module 210.

The positioning administrator 320 according to at least one embodiment is responsive to pre-stored AP radio environment information in the queue frame memory 212 for performing an update of or a deletion from the AP radio environment information in the preset frame areas of the queue frame memory 212. For example, the positioning administrator 320 may be responsive to the AP radio environment information having unchanged AP identification information but changed signal strength information, for updating the latter only, and it may delete the AP radio environment information in the first input frame area and store the received AP radio environment information when a preset number of frame areas is used up.

The positioning determiner 330 verifies the number of AP radio environment informations stored in the queue frame memory 212, determines whether the estimated terminal location is calculable to determine whether to request the positioning apparatus 130 for the location information. For example, the positioning determiner 330 determines that positioning is possible when at least two AP radio environment informations are stored in the queue frame memory 212 and transmits the AP radio environment information to a positioner 340. The positioning determiner 330 requests the positioning apparatus 130 for the location information via a positioning requester 350 when one or no AP radio environment information is stored in the queue frame memory 212.

The positioner 340 is adapted to position the terminal 120 and calculates the estimated terminal location based on the AP radio environment information stored in the queue frame memory 212.

The positioner 340 according to at least one embodiment calculates the estimated terminal location by applying a plurality of AP radio environment information to a heuristic approach but the present disclosure is not limited thereto. A received signal strength indication (RSSI) fingerprint method and a triangulation method are used as necessary.

The positioner 340 receives the location information requested by the positioning requester 350 from the positioning apparatus 130 and indicate the estimated terminal location. For example, when the location information is received as spot A and spot B, the positioner 340 calculates the estimating location of the terminal (i.e., the terminal camping location) by applying a triangulation method or a heuristic approach.

Figure 4:
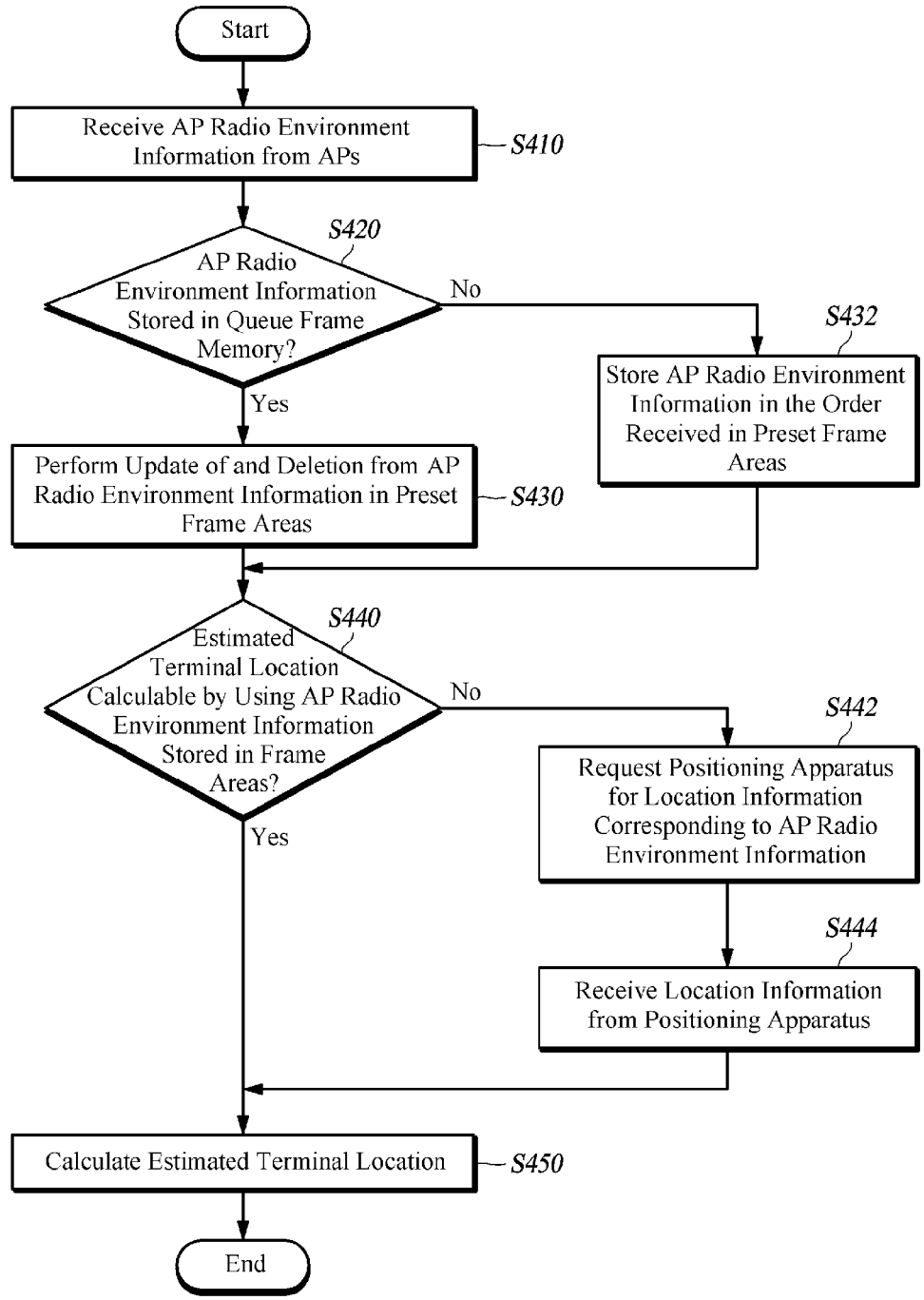
FIG. 4 is a flowchart of an indoor positioning method on a first-in-first-out basis according to at least one embodiment of the present disclosure.

FIG. 4 is a flowchart of an indoor positioning method on a first-in-first-out basis according to at least one embodiment.

For carrying out the indoor positioning on the first-in-first-out basis, the terminal 120 receives, from the AP 110 installed indoors, the AP radio environment information including at least one of the AP identification information, SSID information, signal strength information and signal transmission time information (S410).

The terminal control module 230 verifies the AP radio environment information received from the AP 110 and determines whether the AP radio environment information is pre-stored in the queue frame memory 212 (S420), and if yes, performs an update of or a deletion from the AP radio environment information in the preset frame areas of the queue frame memory 212 (S430). For example, when the AP radio environment information is received with AP identification information unchanged but only the signal strength information changed, the signal strength information is updated, and when a preset number of frame areas is used up, the AP radio environment information in the first input frame area is deleted.

when step S420 verifies that there is no pre-stored AP radio environment information in the queue frame memory 212, the AP radio environment information as received from the AP 110 is stored in the queue frame memory 212 in order of arrival (S432).

The terminal control module 230 determines whether the estimated terminal location is calculable using the AP radio environment information stored in the queue frame memory 212 (S440), and if yes, it calculates the estimated terminal location by using the AP radio environment information (S450). The estimated terminal location may be calculated by applying a plurality of AP radio environment informations to a heuristic approach or by using a RSSI fingerprint method and a triangulation method as necessary.

When step S440 determines that the terminal control module 230 cannot calculate the estimated terminal location by using the AP radio environment information stored in the queue frame memory 212, the terminal control module 230 requests the positioning apparatus 130 for the location information corresponding to the AP radio environment information (S442), and receives the location information from the positioning apparatus 130 and calculates the estimated terminal location (S444 and S450).

Although steps S410 to S450 are sequentially performed in FIG. 4, this is only intended to explain the technical idea of the present disclosure. Various modifications such as changing the order of the steps shown in FIG. 4 or performing at least one of steps S410 to S450 in parallel can be made by those skilled in the art without departing from the scope and idea of embodiments of the present disclosure. The present disclosure is not limited to the time series sequence of FIG. 4.

Figure 5:
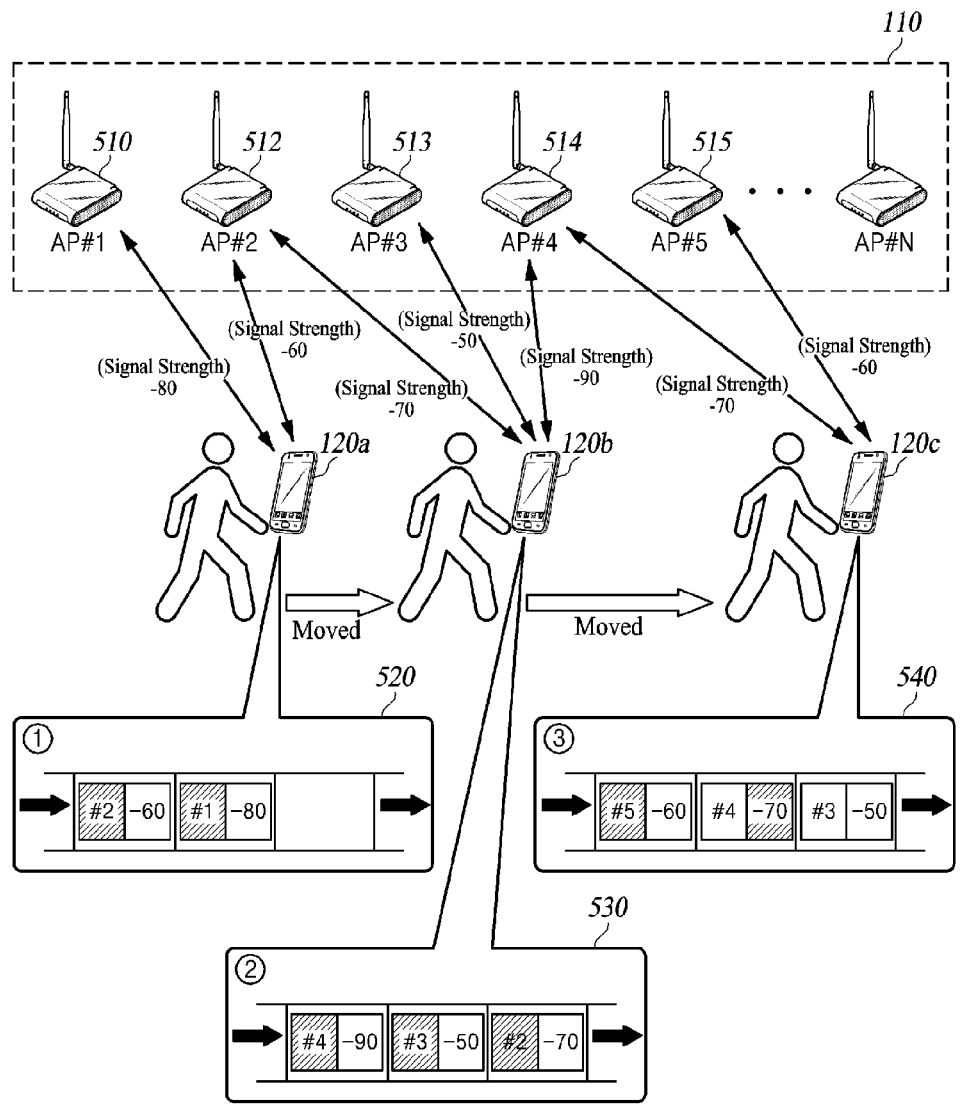
FIG. 5 is an exemplary diagram of a queue frame of an indoor positioning terminal on a first-in-first-out basis according to at least one embodiment of the present disclosure.

FIG. 5 is an exemplary diagram of a queue frame of an indoor positioning terminal on a first-in-first-out basis according to at least one embodiment.

The indoor positioning system on the first-in-first-out basis illustrated in FIG. 5 may be implemented by installing indoors N number of APs 110 (e.g., shopping malls, underground parking lots, etc.) by a mobile carrier or communications business operator, and the AP radio environment information of the installed APs 110 may be stored in the location information DB 140 of the positioning apparatus 130.

A terminal 120a receives AP radio environment information by using AP #1 510, AP #2 512 and Bluetooth schema. The AP radio environment information includes AP identification information and signal strength information. The terminal 120a orderly stores the AP radio environment information as received in a plurality of preset frame areas 520 in order of arrival. Although three frame areas are shown in FIG. 5, the present disclosure is not limited thereto and the number of frame areas 520 may increase or decrease according to the memory of the terminal 120. For example, the terminal 120a receives radio environment information (#1, −80) from AP #1 510, receives information (#2, −60) from AP #2 512 and stores the information in the frame areas 520 in the order of reception.

When the terminal 120a moves to the position of the terminal 120b, the connected AP 110 switches to AP #2 512, AP #3 513 and AP #4 514. In response to the switching of the connected AP 110, the AP radio environment information received by the terminal 120b may be changed. The changed AP radio environment information is stored in the frame areas 530 on the first-in-first-out basis. For example, upon receiving information (#2, −70), (#3, −70) and (#4, −90), the terminal 120b deletes information (#1, −80) pre-stored in the frame areas 530, updates the radio environment information of AP #2 512, and stores the radio environment information (#3, −50) and (#4, −90) of AP #3 513 and AP #4 514 in the order of reception.

When the terminal 120b moves to the position of the terminal 120c, the connected AP 110 switches to AP #4 514 and AP #5 515. For example, when the terminal 120c receives radio environment information (#4, −70) and (#5, −60) from AP #4 514 and AP #5 515 respectively, the radio environment information of AP #2 512 pre-stored in the frame areas 540 is updated and information (#5, −60) received from AP #5 515 is stored in the frame areas 540. Although the connection with AP #3 is terminated, the terminal 120c can maintain data in the frame areas 540 until new AP radio environment information is received.

As described above, according to at least one embodiment of the present disclosure, a terminal receives and stores an access point (AP) information from at least one AP into preset frame regions on a first-in-first-out basis to calculate the position of the terminal, and utilizes a fingerprint method using a database built-up in a positioning apparatus to calculate the position of the terminal only when the terminal positioning with AP information is unavailable, thereby reducing the resources exchanged between the terminal and the positioning apparatus. In addition, performing a positioning based on the AP information received by the terminal can provide increased location accuracy and improved performance of the indoor positioning system.

Some embodiments as described above are implemented in the form of one or more program commands that are read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the non-transitory computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes or functionality in a single ASIC. In some embodiments, one or more of the processes or functionality described herein is/are performed by at least one processor which is programmed for performing such processes or functionality.

Although the exemplary embodiments of the present disclosure have been described, they are merely illustrative for the sake of brevity and clarity. Those skilled in the art will appreciate that various modifications and other equivalent embodiments are possible, without departing from the various characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A terminal device for indoor positioning, the terminal device comprising:
   a communication module configured to receive access point (AP) radio environment information from one or more APs;
   a memory module configured to store the AP radio environment information in a preset number of frame areas, the AP radio environment information being stored in order of reception; and
   a terminal control module configured to
      calculate an estimated location of the terminal device based on the order of the AP radio environment information stored in the preset number of frame areas, and
      verify the number of AP radio environment information updated or deleted,
   wherein the terminal control module further comprises a positioning requester configured to
      transmit a location information request signal including the AP radio environment information to a positioning apparatus when the verified number of the AP radio environment information previously stored in the preset number of frame areas is less than a predetermined number, and
      receive a location information response signal corresponding to the location information request signal from the external positioning apparatus.

2. The terminal device of claim 1, wherein the terminal control module is configured to, when new AP radio environment information including one or more parameters is received, update the previously stored AP radio environment information in the preset number of frame areas by changing corresponding one or more parameters of the previously stored AP radio environment information using the one or more parameters of the new AP radio environment information.

3. The terminal device of claim 2, wherein the terminal control module is configured to update the corresponding one or more parameters of the previously stored AP radio environment information in the preset number of frame areas, when the one or more parameters of new AP radio environment information are determined by the terminal control module to include an unchanged AP identification information but a changed signal strength information.

4. The terminal device of claim 1, wherein the terminal control module is configured to, when new AP radio environment information is received in case the preset number of frame areas is saturated,
delete a firstly stored AP radio environment information among the AP radio environment information previously stored in the preset number of frame areas, and
store the new AP radio environment information in the preset number of frame areas.

5. The terminal device of claim 1, wherein when no new AP radio environment information is received, the memory module is configured to store, the AP radio environment information present in the preset number of frame areas along with a previous AP radio environment information having been received at a previous AP position.

6. The terminal device of claim 1, wherein the terminal control module is configured to use at least one of a heuristic approach, a received signal strength indication (RSSI) based fingerprint method and a triangulation method in order to calculate the estimated location of the terminal device.

7. The terminal device of claim 1, wherein the AP radio environment information include at least one of an AP identification information, a service set identifier (SSID) information and a signal transmission time information.

8. The terminal device of claim 1, wherein the communication module is configured to receive the AP radio environment information by using at least one near field communication including a wireless LAN communication, ultra wideband (UWB) communication, radio frequency communication, infrared data association (IrDA) communication, ZigBee communication and Bluetooth communication.

9. A method performed by a terminal device for indoor positioning, the method comprising:
receiving access point (AP) radio environment information from one or more APs;
storing the AP radio environment information to be inserted in a preset number of frame areas, the AP radio environment information being stored in order of reception;
calculating an estimated location of the terminal device based on the order of the AP radio environment information stored in the preset number of frame areas; and
verifying the number of AP radio environment information updated or deleted,
the method further comprising:
transmitting a location information request signal including the AP radio environment information to a positioning apparatus when the verified number of the AP radio environment information previously stored in the preset number of frame areas is less than a predetermined number, and
receiving a location information response signal corresponding to the location information request signal from the external positioning apparatus.

10. The method of claim 9, further comprising:
when new AP radio environment information including one or more parameters is received,
updating the previously stored AP radio environment information in the preset number of frame areas by changing corresponding one or more parameters of the new AP radio environment information.

11. The method of claim 10, wherein the updating of the AP radio environment information comprises
updating the corresponding one or more parameters of the the previously stored AP radio environment information in the preset number of frame areas, when the one or more parameters of new AP radio environment information are determined by the terminal control module to include an unchanged AP identification information but a changed signal strength information.

12. The method of claim 9, further comprising:
when new AP radio environment information is received in case the preset number of frame areas is saturated,
deleting a firstly stored AP radio environment information among the AP radio environment information previously stored in the preset number of frame areas, and
storing the new AP radio environment information in the preset number of frame areas.

13. The method of claim 9, wherein the AP radio environment information include at least one of an AP identification information, an service set identifier (SSID) information and a signal transmission time information.

14. A system for indoor positioning, the system comprising:
at least one access point (AP) configured to transmit AP radio environment information to a terminal device;
a positioning apparatus configured to
store location information corresponding to the AP radio environment information in a database, and
provide the location information upon receiving a request for the location information from the terminal; and
the terminal device configured to perform indoor positioning,
wherein the terminal comprises:
a communication module configured to receive access point (AP) radio environment information from one or more APs;
a memory module configured to store the AP radio environment information in a preset number of frame areas, the AP radio environment information being stored in order of reception; and
a terminal control module configured to
calculate an estimated location of the terminal device based on the order of the AP radio environment information stored in the preset number of frame areas, and
verify the number of AP radio environment information updated or deleted,
wherein the terminal control module further comprises
a positioning requester configured to
transmit a location information request signal including the AP radio environment information to a positioning apparatus when the verified number of the AP radio environment information previously stored in the preset number of frame areas is less than a predetermined number, and
receive a location information response signal corresponding to the location information request signal from the external positioning apparatus.

* * * * *